July 28, 1959 F. KNOCHENHAUER 2,897,015

OSCILLATION-FREE JOURNALLING DEVICE FOR MAGNETIC RECORDING APPARATUS

Filed Aug. 8, 1956 2 Sheets-Sheet 1

INVENTOR
FRITZ KNOCHENHAUER

INVENTOR
FRITZ KNOCHENHAUER 2,897,015
Patented July 28, 1959

2,897,015

OSCILLATION-FREE JOURNALLING DEVICE FOR MAGNETIC RECORDING APPARATUS

Fritz Knochenhauer, Berlin-Schmockwitz, Germany, assignor to VEB Funkwerk Köpenick, Berlin-Kopenick, Germany Application August 8, 1956, Serial No. 602,811

2 Claims. (Cl. 308—2)

Figure 1:
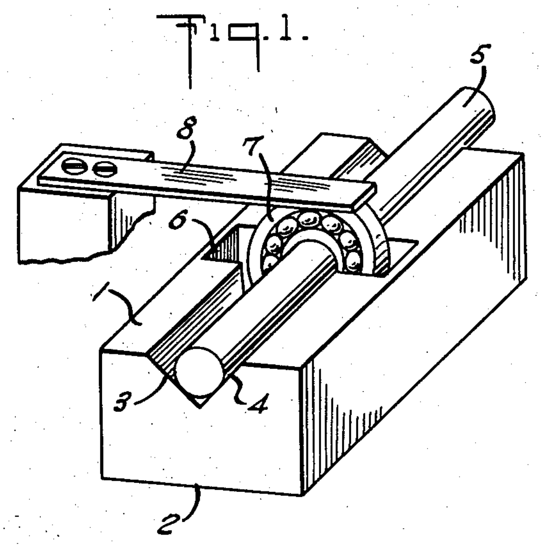

This invention relates to magnetic recording apparatus and is directed particularly to devices for journalling the axle of magnetic tape transport wheels for carrying the tape past a magnetic pickup or recording head.

In order to achieve high quality recording and playback performance in recording apparatus, particularly in magnetic recording apparatus, it is important that the recording medium or tape be moved past the magnetic pickup or recording head with perfectly constant velocity. Oscillation in tape transport velocity during recording produces frequency modulation effects which manifest themselves in changes in tonal value during reproduction.

Recording tapes are now generally driven by means of a pressure roller pressing the tape against a motor-driven rotating tape transport wheel. In order to maintain smooth driving or transport of the sound tape, it is of primary importance that the tape transport wheel axle, hereinafter called the sound axle, be so journalled as to be perfectly free of oscillation, as otherwise periodic fluctuation of the travelling velocity of the tape results. The fidelity of the recorded sound is extremely sensitive to such fluctuations.

In general, the so-called sound axle is vertically arranged, being journalled at the lower end only by a thrust bearing and the other end in a bearing taking up only loads acting in the radial direction. While the lower thrust bearing has no influence on the uniformity of velocity of the sound carrier or magnetic tape, the other bearing must necessarily have absolute minimum play, for which reason only very expensive bearings of the highest quality were used.

It is also known to use precision ground sound axles which run with points on three balls. In other apparatus, precisely ground in slide bearings are used. Ordinary ball bearings cannot be used because they have too much side play and because the manufacture of bearings with the required precision is not possible. Besides the great technical expenditure, these known bearings, insofar as they find application in high quality apparatus, require continual servicing to overcome wear and tear. For this reason it is provided for, in a known magnetic recording apparatus, to replace the old sound axle bearing with a new one after a given number of hours of operation.

It is accordingly the principal object of the present invention to provide an oscillation-free bearing for the sound axle of magnetic sound recording apparatus which is of utmost simplicity which will not require readjustment or reconditioning during the life of the apparatus.

According to the invention, the bearing providing the oscillation-free operation and which takes up only the load acting in the radial direction is formed of two flat bearing surfaces arranged at an angle with respect to each other. Means are also provided for pressing the sound axle into the groove between the two bearing surfaces.

Figure 4:
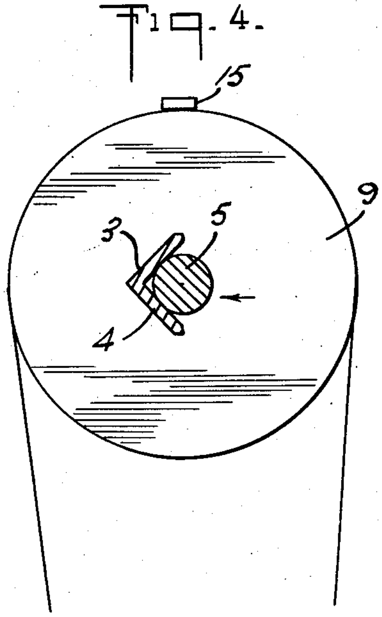
Figure 2:
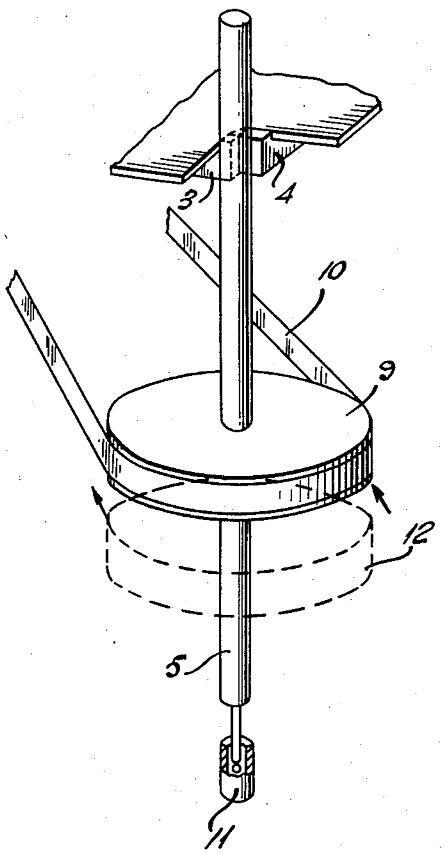
Figure 3:
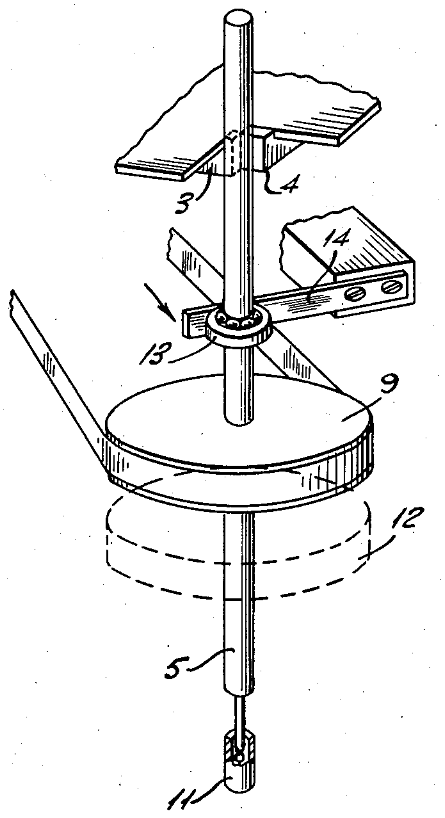

Other objects, features and structural details of the invention will be apparent from the following description when read in conjunction with the accompanying drawings forming part of the specification wherein:

Fig. 1 illustrates, in perspective, one form of the improved bearing structure according to the invention, Fig. 2 illustrates in perspective the entire journalling of a sound axle, the improved bearing device according to the present invention being shown at the upper end of the sound axle, Fig. 3 is a modified form of the bearing device illustrated in Fig. 2, and Fig. 4 is a top view of the improved bearing device and its associated tape-carrying wheel illustrating the operation of the bearing with respect to a magnetic pickup or recording head.

Referring now to Fig. 1, illustrating the first and principal embodiment of the invention, the same comprises a prismatic block 1 having a bottom support surface 2 and which is provided with a longitudinal wedge-shaped groove in its upper surface providing bearing surfaces 3 and 4. The sound axle 5 is disposed within the wedge-shaped groove between the bearing surfaces 3 and 4. The block 1 is also provided with a transverse recess 6, semi-cylindrical in form, within which a roller bearing 7 mounted on the sound axle 5 projects, and which is pressed inwardly into the block 1 by means of a leaf spring 8. The sound axle is thus also pressed against the bearing surfaces 3 and 4. The roller bearing 7 is merely for the purpose of minimizing frictional pressure of the leaf spring 8 against the sound axle 5. Upon the wearing away of the bearing surfaces 3 and 4 and the sound axle 5 during use, the axle will be pushed deeper into the bearing so that the spacing between the longitudinal axis of the sound axle and the bottom surface 2 of the block 1 will become somewhat lessened; the operation of the bearing is not affected, however, since the sound axle 5, as before, is pushed without restriction into the bearing surfaces 3 and 4 by the spring 8. As is hereinbelow more particularly described, by a suitable arrangement of the bearing it is possible to eliminate even the slight disturbing influence of the lessening of the distance between the sound axle 5 and the bottom surface 2 of the bearing upon the quality of sound reproduction.

Referring now to Fig. 2 illustrating the whole journalling arrangement of the sound axle 5, the numerals 3 and 4 again designate the two bearing surfaces, 9 designates the sound wheel or tape carrying wheel, 10, the recording medium or magnetic tape, and 11, the above-described thrust bearing for receiving the axial pressure resulting from the weight of the sound axle 5 and the sound wheel 9. In this embodiment of the invention, the sound wheel carrying sound axle is pressed against the bearing surfaces 3 and 4 by means of the pressure roller 12 illustrated in broken lines. The direction of pressure applied by the pressure roller 12 is schematically shown by the two arrows. It will thus be evident that the spring 8 required in the embodiment of the invention illustrated in Fig. 1 can be dispensed with. The bearing surfaces 3 and 4 can be of a synthetic plastic material of great hardness.

In order to lessen the pressure effected upon the sound axle 5 against the bearing surfaces 3 and 4 by the pressure roller 12, in accordance with Fig. 3 a roller bearing 13 or another transverse bearing can be arranged on the sound axle 5 against which a compression spring 14 operates. As illustrated by the arrow, the pressure exerted by the spring 14 must be counteracting with respect to the pressure effected by the pressure roller 12 and obviously at the same time less than the pressure effected by said roller. The axle pressure against the bearing surfaces 3 and 4 is thus lessened, while the required pressure between the pressure roller 12 and the sound wheel 9 is not lessened, so that, as before, a holding friction sufficient to drive the sound tape 10 is provided.

By means of the invention it is possible to provide exceptional quality in magnetic recording apparatus for transmitting repeating signals, for example radio station identification, etc., wherein an endless band or magnetic tape runs continually. In such apparatus, the recording medium or tape does not slide directly along the magnetic pickup head but has a spacing of $\frac{1}{20}$ of a millimeter with respect thereto. This spacing formerly could not practically be constantly maintained over a period of time. By use of the bearing structure in accordance with the present invention, however, it is possible to maintain such a spacing indefinitely. In order to eliminate the above-mentioned influence of the wearing of the bearing surfaces 3, 4 and the sound axle 5 on reproduction quality the pickup head is arranged as illustrated in Fig. 4. In Fig. 4, 3 and 4 again designate the bearing surfaces, the numeral 5, the sound axle, the numeral 9, the sound wheel, and the numeral 10, the recording medium or magnetic tape. The pickup head 15 is so arranged that the line of interconnection between it and the center point of the sound axle is perpendicular to the central line of the wedge-shaped bearing surfaces 3 and 4. Upon wearing away of the bearing surface portions, the sound axle shifts somewhat in the direction as illustrated by the arrow. The spacing between the pickup head 15 and the magnetic tape 10 remains practically constant, however.

While I have described preferred embodiments of my invention, it is understood that this disclosure is for the purpose of illustration and that various omissions, or changes in arrangement of parts, as well as the substitution of equivalent elements for those herein shown and described, may be made without departing from the spirit and scope of the invention as set forth in the appended claims.

What I claim is:

1. In an oscillation-free bearing device for journalling the cylindrical sound axle of a magnetic recording apparatus, the combination comprising a bearing member formed with a pair of planar bearing surfaces arranged at an angle with respect to each other, and means for pressing the cylindrical axle longitudinally in the bight formed by said bearing surfaces, said means comprising a pressure roller acting against said axle.

2. In an oscillation-free bearing device for magnetic sound apparatus, the combination comprising a cylindrical magnetic tape transport axle, a bearing structure comprising a pair of planar bearing surfaces arranged at an angle with respect to each other, said cylindrical axle being longitudinally disposed within the groove formed between said bearing surfaces, and means for resiliently pressing said axle into said groove, said axle pressing means comprising a pressure roller acting against said axle, a transverse bearing mounted on said axle, and resilient pressure means acting against said bearing in a direction opposite to the direction of pressure force effected by said pressure roller on said axle, the pressure force effected by said pressure means being less than the pressure force effected by said roller.

References Cited in the file of this patent

UNITED STATES PATENTS

| | | |
|---|---|---|
| 811,194 | Barclay | Jan. 30, 1906 |
| 1,806,179 | Reeves | May 19, 1931 |
| 2,180,853 | Scheppmann | Nov. 21, 1939 |
| 2,612,565 | Heller | Sept. 30, 1952 |
| 2,677,727 | Haynes | May 4, 1954 |

FOREIGN PATENTS

| | | |
|---|---|---|
| 749,452 | Germany | Nov. 23, 1944 |